Patented July 15, 1941

2,248,965

UNITED STATES PATENT OFFICE 2,248,965

BAKING OIL

Frank W. Corkery, Crafton, Pa., assignor to Falk & Company, a corporation of Pennsylvania No Drawing. Application July 16, 1938, Serial No. 219,613

2 Claims. (Cl. 260—407)

This invention relates to the production of oils of the type adapted to inclusion in a baked coating.

The object of the invention is to produce an oil or oleo-resinous composition (which latter will be herein considered as falling generically within the class of oils) having the size of a preponderant proportion of its molecules so increased that, by virtue of such structure, the oil has minimized qualities of penetration. This I effect while retaining the solubility of the oil in organic solvents, with consequent capability of the oil when diluted, or cut back, to flow freely, to have good spreading qualities, and adequately to level off when applied as a coating.

Although the process of kettling saponifiable oils, of the sort known as drying oils and semi-drying oils, involving polymerization, molecular rearrangement, and intra-molecular changes, increases the molecule size of the oils, the effect thus obtainable is rather rigidly limited by the relative proportion of the glycerides of unsaturated and saturated fatty acids in the oil. Polymerization is attended by a decrease in drying qualities. Blowing the oil with air, while heating to a temperature below the stage at which polymerization takes place, tends to increase the average molecule size of the oxidizable constituents of the oil. In itself, however, polymerization does not result in the building of molecules of extremely great size, to produce an oil notably lacking in ability to penetrate, nor does it greatly improve the drying and film-forming characteristics of the oil. If a blowing operation be conducted under temperature conditions of a severity sufficient to cause polymerization, it has a very detrimental effect on the color of the oil and certain other qualities of the oil. Sequentially to kettle the oil, and to blow it in accordance with standard practice gives but little effect from the blowing operation.

In my co-pending applications Serial No. 195,345, filed March 11, 1938, and Serial No. 209,533, filed May 25, 1938, I have disclosed processes in which an oxidizable oil, such as a drying oil, or semi-drying oil, is carried to a high stage of oxidation by blowing. In the methods disclosed in those applications, the oil is blown, under conditions avoiding substantial polymerization therein, up to a stage at which gelation of the oil is imminent. At such stage the gel structure which has been formed in the oil is dispersed by the addition of an oil-soluble resin, or a raw oxidizable oil, and gelation being thus held off, blowing of the oil is continued additionally to effect oxidation therein.

It is further my discovery that this procedure may be practiced sequentially after kettling, to oxidize to a maximum extent the oil which has been polymerized by the kettling, and thus to obtain an oil a large proportion of the molecules of which have been increased to a size not previously obtained without physical gelation of the oil. As a matter of greater importance, the drying qualities, which have been impaired by polymerization, are in large measure restored. The product of this process, involving the step of kettling as an initial procedure, and a procedure in accordance with the principles of my oxidation process, modified to suit the condition of the oil acted upon in the blowing treatment, is an oil notably lacking in qualities of penetration. It has fair drying qualities, and is peculiarly adapted to use in baked coatings. Its adaptability to this purpose is of novel sort, in that it not only tends to remain upon porous surfaces without penetration, but also is capable of overlying a coating of thermoplastic nature, without penetration by the two coatings under temperatures to which they are subjected in heat drying.

In order to illustrate the principles of my invention, and to give specific guide for its useful employment, I shall now exemplify it as follows:

*Example No. 1*

A batch of 3000 pounds of fish oil was heated for about 1.5 hours to a temperature within the range of 500° F. to 600° F. This resulted in a reduction of its iodine value from about 180 to about 100. Its viscosity was thus increased from about 100 Saybolt seconds at 210° F. to about 250 Saybolt seconds at 210° F., and from about body A on the Gardner & Holt scale to about body T. The oil, by its kettling, had been deprived of about 11/18 of its initial capacity for oxidation.

This kettled oil was divided into two equal portions, and one of these portions was introduced into a blowing vessel, equipped with heating coils, and with perforate coils for the introduction of air. The batch was maintained at a temperature of about 250° F., and by means of an adequate blower air was blown through it at about the standard rate of blowing of 1.65 cubic feet of air per pound of the batch per hour. At the end of about 7 hours the viscosity of the batch had increased to about 1100 Saybolt seconds at 210° F.; at the end of 8.5 hours it had increased to about 1450 Saybolt seconds at 210° F.; after about 10 hours to a similarly determined viscosity of about 1840; and after 11 hours to a similarly determined viscosity of about 2300. Blowing was continued for a total period of about 12 hours, at the end of which period the viscosity of the oil had been increased to about 3000 Saybolt seconds at 210° F.

At this stage, gelation being imminent, the other portion of the oil, kettled but unoxidized, was added to disperse the existing gel structure. Blowing was then continued for a further period of about 4 hours, at which stage the oil was considered to have received its maximum oxidation treatment from the procedure.

The treated oil is then in such condition that when diluted in equal parts by weight of mineral spirits, the viscosity of the solution is about 100 Saybolt seconds at 210° F., and has a body A on the Gardner & Holt scale. The iodine value of the treated oil is about 70. The molecular condition of the oil is thus such that it may be considered throughout a substantial range of its constituents to have undergone polymerization, while its constituents which possessed initially capacity for oxidation have been oxidized to an approximate maximum, allowing for the reduction in capacity to be oxidized resulting from the polymerization treatment.

*Example No. 2*

A batch of 3,000 pounds of soya bean oil was kettled for about 25 hours at a temperature within the range of 500° C. to 600° C. By this kettling the viscosity of the oil was increased from about 100 Saybolt seconds at 210° F. to about 200 Saybolt seconds at 210° F., and from a body A on the Gardner Holt scale to about a body Q on that scale. The initial iodine value of the oil was about 135, and this was decreased by kettling to about 93. The kettled oil was divided into two equal portions, and one of these portions was blown, as in Example No. 1, for a total initial period of about 17 hours.

At the end of that blowing period, physical gelation of the oil being imminent, the second portion of the kettled oil, in unoxidized condition, was added to the batch, and blowing was continued for an additional period of about five hours. When gelation again became imminent, at a viscosity of about 1500 Saybolt seconds at 210° F. the treatment was considered to have been finished.

The product was closely analogous to that obtained in Example No. 1. When mixed in equal parts by weight with mineral spirits, the viscosity of the solution was about 100 Saybolt seconds at 210° F., or about body A on the Gardner & Holt scale. The iodine value of the treated oil was about 70.

*Example No. 3*

A batch of 1000 pounds of fish oil was heated for about 1.5 hours to a temperature within the range of 500° F. to 600° F. This resulted in a reduction of its iodine value from about 180 to about 100. Its viscosity was thus increased from about 100 Saybolt seconds at 210° F. to about 250 Saybolt seconds at 210° F., and from about body A on the Gardner & Holt scale to about body T. The oil by its kettling had been deprived of about 11/18 of its initial capacity for oxidation.

The kettled oil was introduced into a blowing vessel equipped with heating coils and with perforate coils for the introduction of air. The batch was maintained at a temperature of about 250° F., and by means of an adequate blower, air was blown through it at about the standard rate of blowing of 1.65 cubic feet of air per pound of the batch per hour. At the end of about seven hours the viscosity of the batch had increased to about 1100 Saybolt seconds at 210° F.; at the end of about 8.5 hours it had increased to about 1450 Saybolt seconds at 210° F.; after about 10 hours to a similarly determined viscosity of about 1840; and after 11 hours to a similarly determined viscosity of about 2300. Blowing was continued for a total initial period of about 12 hours, at the end of which period the viscosity of the oil had been increased to about 3000 Saybolt seconds at 210° F.

At this stage gelation being imminent, there was added 1000 pounds of ester gum, having a melting point of about 190° F., the addition of the ester gum serving to disperse the gel structure formed by the initial blowing treatment. Blowing was then continued for a further period of about four hours, at which stage the oil was considered to have received its maximum treatment from the procedure.

The resultant oleo-resinous product had a melting point of about 96° F. and was soluble in both the aromatic hydro-carbon solvents and the aliphatic hydro-carbon solvents. It flowed readily and levelled off well when diluted in equal weight with either of those solvents and dried in about 15 hours in air. It has proved to be an excellent oil for use in, or as, a baked coating.

*Example No. 4*

A batch of 3000 pounds of soya bean oil was kettled for about 25 hours at a temperature within the range of 500° F. to 600° F. By this kettling the viscosity of the oil was increased from about 100 Saybolt seconds at 210° F. to about 200 Saybolt seconds at 210° F., and from about a body A on the Gardner & Holt scale to about a body Q on that scale. The initial iodine value of the oil was about 135 and this was decreased by kettling to about 93.

The kettled oil was introduced into a blowing vessel and was blown as in Example No. 3 for a total initial period of about 17 hours. At the end of that initial blowing period physical gelation of the oil being imminent, there was added an equal weight of ester gum to disperse the gel structure formed during the initial blowing, and blowing was continued for an additional period of about five hours. When gelation again became imminent, the treatment was considered to have been finished.

The resultant oleo-resinous product was closely analogous to that obtained in Example No. 3. It had a melting point of about 96° F. and was soluble in both the aromatic hydro-carbon solvents and the aliphatic hydro-carbon solvents. When diluted with equal weight of either of those solvents a film of the oil dries in about 20 hours. It has proved to be an excellent oil for use in or as a baked coating.

The foregoing is exemplary of my method in application of its principles to the treatment of semi-drying oils. As exemplary of my method in practice of its principles upon one of the standard drying oils (linseed oil and perilla oil) I give the following examples:

*Example No. 5*

A batch of 1400 pounds of perilla oil was raised to a temperature of about 550° F., and was held at that temperature for about 1.75 hours. The viscosity of the oil was increased by this kettling from about 100 Saybolt seconds at 210° F. to about 500 Saybolt seconds at 210° F.

The oil thus treated was introduced into a blowing vessel, and was blown under the same conditions described in the preceding examples, save that the temperature of the batch was maintained at about 220° F. After blowing for about 9 hours, a viscosity of about 3000 Saybolt seconds had been attained, and the batch had reached a point at which gelation was imminent. At that stage of the blowing, 600 pounds of rosin was added, and blowing was continued for a further and additional period of about three hours, at which stage the product (when cooled) was a semi-solid, having a viscosity of about 2700 Saybolt seconds at 210° F.

The product was soluble in both the aromatic hydro-carbon solvents and the aliphatic hydro-carbon solvents. When cut with an equal weight of solvent, the solution has a body of A to B on the Gardner & Holt scale. The oil drys in air in about 5 hours. It is of particular excellence as, or in, a baked coating.

Example No. 6

A batch of 2000 pounds of perilla oil was raised to a temperature of about 550° F., and was held at that temperature for about 1.75 hours. The viscosity of the oil was increased by the kettling from about 100 Saybolt seconds at 210° F. to about 500 Saybolt seconds at 210° F.

The oil was divided into two equal portions and one of these portions was introduced as a batch for blowing into a blowing vessel, and was blown under the same conditions and to the same stage as described in Example No. 5. When the viscosity had been raised to about 3000 Saybolt seconds at 210° F., and gelation was imminent, the other portion of the kettled oil was added to the batch and blowing was continued for an additional period of about three hours, until the oil had attained a viscosity of about 2000 Saybolt seconds at 210° F. The product was substantially identical in its qualities with the product obtained in Example No. 5.

Where melting points are given in the examples, it is to be understood that those melting points are taken by the ball and ring method. All viscosities which are given were taken on the Saybolt Furol viscosimeter. Where drying time is given, it is to be understood that this drying time is based upon tests made in accordance with an accepted procedure for the estimation of rates of drying. This test consists in bringing the blown oil back to the viscosity of a corresponding raw oil by the addition of a suitable solvent; adding selected oil-soluble lead, cobalt or manganese driers in the quantity commonly thus employed, and spreading the material in a thin film so that after drying the film is between 0.002 and 0.004 of an inch, which drying is effected at 77° F. and about 50 relative humidity. Although the oil is polymerized before blowing, the blowing operation is in each instance conducted at such temperature that in it no substantial further polymerization is caused.

It should be explained that, if desired, a mixed oil, such, for example, as a mixture of soya bean oil and perilla oil, or a mixture of soya bean oil and fish oil, may be subjected to treatment. Instead of ester gum any of the oil-soluble thermoplastic resins or synthetic or natural oils may be used to replace the ester gum in those examples in which a resin is added at the end of the initial blowing period to effect dispersion of the gelled structure in the batch. Coumarone resins, petroleum resins, and rosin are typical of the oil-soluble thermoplastic resins which may be used for the purpose. In effecting gel dispersion by means of various resins, it is desirable to vary the relative proportions of the oil contained in the initial batch and the resin inversely to the oil-solubility of the resin used. Mixtures of two or more resins may successfully be used.

I have found that gel dispersion may be effected by adding resin within the range of 20% and 70%, the weight of the final batch resulting from its addition, or drying oil in the range of 35% to 60% the weight of the final batch resulting from its addition. The examples prescribe the addition of polymerized but unoxidized oil for gel-dispersion, but unpolymerized and unoxidized oil may be added for that purpose, at a proportional sacrifice in the non-penetrating character of the oil.

The product of my method in any of its variants exemplified or suggested above has qualities rendering it peculiarly adapted for baked coatings. When applied to highly porous substances, the great increase in the molecule size of a large proportion of its constituents resultant from the sequential steps of polymerization and oxidation wholly prevents penetration of the oil into the porous body upon which it is laid. On the other hand it has good solubility in the solvents commonly employed, giving it good spreading qualities, and permitting it to level off well when applied. A baked film of the oil is both hard and elastic, and has good adhesion.

Probably the most remarkable quality of the oil obtained by practising my method is that although it has been initially deprived of a great proportion of its drying capacity by polymerization, the final blown product has drying qualities closely comparable to those of the initial raw oil. This is attributable to the two-stage blowing process to which the oil is subjected, with gel dispersion effected by the addition of unoxidized oil, or oil-soluble resin, at an intermediate stage as close as possible to the point at which continued blowing would result in bodily gelation of the batch. The following theory is advanced to explain the remarkable result of restoring drying qualities of a kettled oil without depriving the oil of the effects of polymerization obtained by kettling. Initially the mechanics involved may be illustrated by comparing the composition of a raw soya bean oil, a raw linseed oil and a soya bean oil subjected to my novel two-stage blowing operation.

Raw linseed oil contains the glycerides of oleic acids, linoleic acids, and linolenic acids in such proportion that the glycerides of the unsaturated fatty acids represent approximately 72% of the oil, while inactive fatty acid glycerides (preponderantly olein) are approximately 28% of it. While it is not technically correct to say that olein is a saturated glyceride, it is a normally unreactive glyceride, with only one double bond and no conjugated double bonds, in its molecular structure. Although these glycerides include relatively small proportions of stearin, palmitin, and palmitolein, olein so preponderates that the sum of these glycerides will hereinafter be referred to generically as "olein." When spread in a film, the oil dries by absorbing oxygen from the air, and gels are formed of the glycerides of the linoleic and linolenic acids, while the film is rendered continuous by the dispersing effect of the olein. Linseed oil is so balanced in its unsaturated and saturated constituents that in its raw condition the oil dries normally to a good coating.

Soya bean oil differs from linseed oil in that its content of olein is much greater than the olein content of linseed oil; thus when a film of raw soya bean oil is spread, and oxidation takes place, the dispersing effect of the olein on the gels formed by the oxidation of the unsaturated glycerides is so great that a very soft film is produced. When either linseed oil or soya bean oil is kettled, polymerization decreases the ability of its content of unsaturates to absorb oxygen, so that the drying time is lengthened. Polymerization in the oil has very little effect on the type of film produced, save that the increase in viscosity increases the flow (i. e. the levelling qualities) of the oil. When either linseed or soya bean oil is blown, the unsaturates are given an initial oxygen addition, the linkage being relatively weak, so that the blown oils, when spread in a film, dry slightly faster than corresponding raw oil, but the inherent film characteristics of the oil are not greatly affected.

In the new treatments outlined above, the dispersing effect of the non-volatile, solvent olein is partially inhibited in the following manner:

When soya bean oil is preoxidized to a high stage of preoxidation, there is consequent increase in the size of the oxidized moles to a point at which gelation normally would take place if oxidation were continued. By adding raw oil, these large moles are then dispersed in normal moles, and blowing is continued. In this step of the process, blowing is continued to a stage in which the portion of the oil initially blown is converted to approximately its maximum gel structure, while the gels are held in dispersion by the partially oxidized other constituents of the oil. The treated oil then contains moles of oxidized linoleic and linolenic glycerides which have absorbed their full content of oxygen, and also contains moles on which only partial oxidation has been effected, the unsaturates in various degrees of oxidized condition being in decreased measure dispersed in the olein present. The large size of some of the moles requires a larger than normal amount of olein moles to coat them, and to render a film of the oil continuous.

Thus, it can be seen that by the treatment of my method I have in effect destroyed the property of the semi-drying soya bean oil (taken as exemplary) to dry to a tacky film. This is because the plasticizing action of the olein is expended in spreading over and coating moles of unusually great size, thereby decreasing the dispersive effect of the olein by rendering more exacting the performance of its primary function in imparting continuity to a film of the oil. The olein thus does not in normal measure inhibit further oxidation of the partially oxidized moles in a film of the oil, either to retard drying oxidation or to prevent its continuance to the stage of hard film formation.

Now in the present method, although kettling has by polymerization deprived the oxidizable constituents of the oil in large measure of their capacity for oxidation and consequently of their drying qualities, the residual capacity for oxidation in those constituents of the oil has been utilized to produce the phenomena above described.

This results in restoring wholly or in large measure the capacity of the oil to air-dry in a film. The oil, though having in increased measure the non-penetrating qualities of a kettled oil, may nevertheless be used to form an air-dried film in a manner in which an oil kettled by standard practice may not. Further, the quality of the oil as a non-penetrating baked coating is enhanced. A very important use of my product is in the manufacture of oilcloth, in which a layer of the coating is laid over a layer of asphalt, pitch, or wax. In baking, there is no inter-penetration of these two layers of different substance, but on the contrary the oil dries to a hard coherent film, adherent to, but unpenetrated by, the asphalt, pitch, wax, or other like material. This quality of resisting penetration by base materials which are rendered soft at baking temperatures is in itself a novel and valuable characteristic, and, when coupled with the good film-forming qualities of my oil, gives an oil almost perfect for such purposes.

China-wood oil, because of the intermolecular and intramolecular effects peculiar to it, cannot by itself be subjected to my process, and cannot be included in substantial proportion to make with standard drying oils and semi-drying oils a blended starting material. While, therefore, the term "oxidizable drying oil" as used in the appended claims is to be taken as defining generically the standard drying oils (linseed oil and perilla oil) and the semi-drying oils (fish oil, sardine oil, pilchard oil, soya bean oil, sunflower seed oil, rape seed oil, safflower oil, walnut oil, etc.), and various blends of these oils, it is to be understood as excluding China-wood oil, and blends containing a substantial proportion of that oil.

A divisional application based on the disclosure hereof, for an improvement in Baking oils, bears Serial No. 385,547, and the filing date of March 27, 1941.

I claim as my invention:

1. The herein described method of treating oxidizable drying oils to produce a baking oil of particularly high non-penetrating qualities which comprises effecting polymerization in an oil having drying qualities and having a capacity for polymerization less than that of China-wood oil by heating the said drying oil at a polymerizing temperature within the approximate range of 500° F. to 600° F. to a stage in which the oxidizable constituents of the oil are in large measure deprived of drying qualities but retain residual capacity for oxidation, and restoring to the said oil drying qualities lost by polymerization by blowing air therethrough at an oxidizing temperature to a stage of preoxidation at which gelation of the oil becomes imminent, at such stage effecting gel dispersion in the batch by introducing a similar oil similarly polymerized but in unoxidized condition as an oil-soluble film-forming gel dispersant, and after such gel dispersion continuing to blow air through the batch for a substantial blowing period to a stage at which gelation of the oil is again approached.

2. The herein described method of treating oxidizable drying oils to produce a baking oil of particularly high non-penetrating qualities which comprises effecting polymerization in an oil having drying qualities and having a capacity for polymerization less than that of China-wood oil by heating the said drying oil at a polymerizing temperature within the approximate range of 500° F. to 600° F. to a stage in which the oxidizable constituents of the oil are in large measure deprived of drying qualities but retain residual capacity for oxidation; and restoring to the said oil drying qualities lost by polymerization by blowing air therethrough at an oxidizing temperature to a stage of preoxidation at which gelation of the oil becomes imminent, at such stage effecting gel dispersion in the batch by introducing a similar oil similarly polymerized but in unoxidized condition as an oil-soluble film-forming gel dispersant in a quantity equal to about 35% to 60% the weight of the total batch resulting from its addition, and after such gel dispersion continuing to blow air through the batch for a substantial blowing period to a stage at which gelation of the oil is again approached.

FRANK W. CORKERY.